United States Patent
Ritter et al.

(10) Patent No.: US 6,741,691 B1
(45) Date of Patent: May 25, 2004

(54) CALL-BACK METHOD FOR TELECOMMUNICATIONS AND DEVICES ADAPTED ACCORDINGLY

(75) Inventors: Rudolf Ritter, Zollikofen (CH); Walter Heutschi, Jegenstorf (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/622,537

(22) PCT Filed: Feb. 19, 1998

(86) PCT No.: PCT/CH98/00066

§ 371 (c)(1),
(2), (4) Date: Aug. 18, 2000

(87) PCT Pub. No.: WO99/43139

PCT Pub. Date: Aug. 26, 1999

(51) Int. Cl.[7] ................................. H04M 3/24
(52) U.S. Cl. .................. 379/210.01; 370/354
(58) Field of Search ...................... 379/114.01, 114.02, 379/114.21, 114.28, 210.01, 219, 220.01, 221.01, 221.02, 221.05, 221.06, 221.07, 221.14, 224; 370/351–359, 400, 401

(56) References Cited

U.S. PATENT DOCUMENTS

| | | | |
|---|---|---|---|
| 5,311,583 A | * | 5/1994 | Friedes et al. ......... 379/210.01 |
| 5,420,914 A | | 5/1995 | Blumhardt |
| 5,509,004 A | | 4/1996 | Bishop, Jr. et al. |
| 5,790,642 A | * | 8/1998 | Taylor et al. .......... 379/114.02 |
| 6,088,436 A | * | 7/2000 | Mashinsky ............. 379/210.01 |
| 6,212,268 B1 | * | 4/2001 | Nielsen ................. 379/210.01 |

FOREIGN PATENT DOCUMENTS

| | | |
|---|---|---|
| WO | WO 97/05749 | 2/1997 |
| WO | WO 97/19548 | 5/1997 |
| WO | WO 97/46036 | 5/1997 |
| WO | WO 97/24860 | 7/1997 |
| WO | WO 97/17815 | 12/1997 |

* cited by examiner

Primary Examiner—Roland Foster
(74) Attorney, Agent, or Firm—Oblon, Spivak, McClelland, Maier & Neustadt, P.C.

(57) ABSTRACT

The present invention relates to a call-back method for telecommunications and to devices adapted accordingly, wherein a first subscriber with a first communication end device (A) that preferably comprises a SIM-card, indicates to a telecommunication system that he wants to communicate with at least a second subscriber with a second communication end device (B). Connections (10, 11, 2a, 2c) are further established to a backbone (1) through a local gateway (3a) and a destination gateway (3c), wherein said gateways provide for an economical communication. The local gateway (3a) and the destination gateway (3c) are determined so that the current charging rate towards the communication end devce (A) of the calling subscriber, or towards the communication end device (B) of the a called subscriber, is as reduced as possible. The current charging rates of the gateways (3a, 3b, 3c) are monitored during the communication and, if need be, a communication end device (A) is connected by handover to the backbone (1) through a more economical gateway (3b).

30 Claims, 1 Drawing Sheet

CALL-BACK METHOD FOR TELECOMMUNICATIONS AND DEVICES ADAPTED ACCORDINGLY

Figure 1:
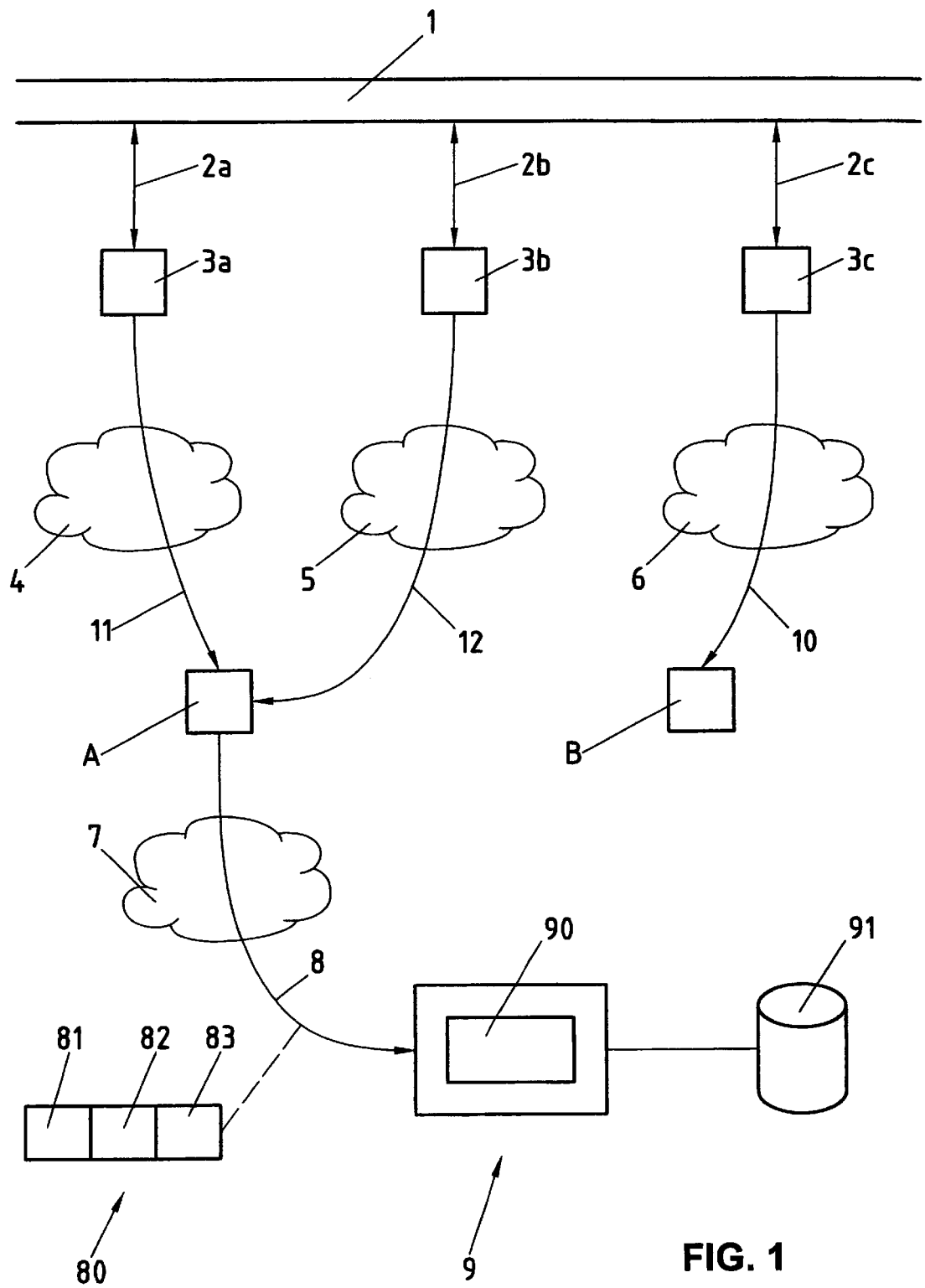

This application is the national phase of international application PCT/CH98/00066 filed Feb. 19, 1998 which designated the U.S.

The present invention relates to a callback method for telecommunications with devices adapted accordingly, in particular a callback method via a backbone.

Callback methods in which a service provider assigns a special access number to a subscriber are known in telephony. The subscriber dials this number and hangs up. A computer of the service provider calls the subscriber back with a dial-tone to a network with low tariffs, after which the subscriber may dial the number of his communication partner as usual. Other methods make it possible for the subscriber to pre-define certain destination numbers, such that these numbers are routed automatically by the computer of the service provider to a network with low tariffs.

Described in the patent application WO 97/17815 are a method and a system for telecommunications in which calls are routed in an optimal way with respect to costs, tariff costs for services between specific points in the telecommunications network, which are indicated by competing services providers and are stored in a database, being taken into consideration.

Described in the patent application WO 97/46036 is a method for a mobile satellite communications system with a GSM network infrastructure for establishing an optimal connection with respect to costs between a mobile terminal and a fixed terminal. According to the method described in WO 97/46036, cost optimization is achieved in that, based on the call number of the fixed terminal and based on a reference table with country and regional codes, stored in the mobile terminal, a switching center is selected in which the mobile device is registered.

Described in the patent application WO 97/19548 is a callback method for telecommunications in which a user in a country with high communication tariffs transmits to a network operator in a country with low tariff costs a message with his call number and with the call number of the party to be called via a non-signalling network, for example the Internet. According to the method described in WO 97/19548, this operator calls, first of all, the party to be called via a telephone network, then upon received response from the party to be called, the operator calls the calling user back via the telephone network and connects the party to be called and the calling user for speech communication.

Described in U.S. Pat. No. 5,420,914 are a method and a system for real-time selection of an economical network operator for the long-distance connection for a telephone call. According to the method described in U.S. Pat. No. 5,420,914, at a service control point (SCP) the destination LATA (Local Area Telephone Access) is determined from a call information signal of the call of a calling user, and the most economical network operator at the moment for the establishment of the long-distance connection is selected to this destination LATA is determined based on stored tariff information. According to the method described in U.S. Pat. No. 5,420,914, the long-distance connection is established using the services of the selected most economical network operator, and afterwards the connection completed of the destination LATA to the terminal with the called number.

A callback method is known from Digital Long Distance (DLD) Corporation (DLD Mobile Callback, according to www.digitcom.com of Dec. 22, 1997, filed as a US patent application) in which a local network computer (Point-of-Presence, POP) captures the called number and sends digitized call data via the low cost Internet to respective nodes (POP) participating in the method. In this callback method, the POP closest to the destination determines the most cost-effective telephone connection available to complete the call, and establishes the corresponding telephone connection between the destination POP and the local line to the local network computer (local POP). Thereafter, the destination POP completes the circuit with a second local telephone line to the destination end. Besides the low cost for establishing the connection via the Internet, the communication costs are reduced to the costs of the two local connections to the local POP and to the destination POP, the long-distance call dialed for the low tariff.

It is an object of this invention to propose a new and improved callback method for telecommunications.

According to the present invention, this object is achieved particularly through the features of the independent claims. Moreover, this object is also achieved through the system according to the independent system claim. In addition, further advantageous embodiments follow from the dependent claims and the description.

In particular, these objects are achieved according to the invention in that the callback method is implemented such that a connection with the communication terminal of the calling participant is established from a local gateway and that a connection with the communication terminal of the called participant is established from a destination gateway and that the data transmission from the local gateway to the destination gateway takes place via a backbone. Besides the low costs for establishing the connections from the gateways to the backbone, the communication costs are reduced to the costs of the two local connections to the local gateway and to the destination gateway, as well as to the costs of the data transmission via the backbone, which can turn out to be negligibly low, depending on the embodiment.

Preferably, the destination gateway and the local gateway are determined such that the current tariff from the destination gateway to the communication terminal of the called participant or from the local gateway to the communication terminal of the calling participant, respectively, are the lowest possible. Obviously, the communication costs of the two local connections can thereby be kept optimally low.

Preferably, the tariff costs from the local gateway to the communication terminal of the calling participant and from the destination gateway to the communication terminal of the called participant are subsequently compared with the tariff costs of a direct connection between the communication terminals. If its tariff costs are more favorable, a direct connection between the communication terminals of the calling and the called participant is established instead of a connection via the backbone. This approach has the advantage that it ensures that the callback variant with communication via gateways and backbone is only used when it is actually cost beneficial.

In the present invention, the current tariffs of the gateways are being monitored for the duration of the connection. If the current tariff of a more cost-effective gateway is lower by a pre-defined amount than the current tariff of the gateway used at the moment, the respective communication terminal is connected to the backbone via the more cost-effective gateway as a result of a connection change. This has the additional advantage that the communication costs can be optimized even for the duration of the connection.

Preferably, the callback method of the present invention is initiated through a special message which is prepared by a SIM-card and transmitted to a service center. This has the additional advantage that a participant (or a group of participants) may make use, by means of his (their) personal SIM-card, of personal callback services which are transferable to other communication terminals.

An embodiment of the present invention is described below by way of example. The embodiment example is illustrated by means of the following appended figure:

FIG. 1 shows an overview diagram with a backbone, with which communication networks are connected by means of gateways, and communication terminals which can communicate via the communication networks with the gateways and with a service center.

Reference character A refers to a communication terminal of a calling participant, not illustrated, who wishes, for instance, to communicate with a called participant, also not illustrated, with a communication terminal B. There are different variants to initiate a callback method for establishing a connection to the called participant. For example, the calling participant may decide that a callback method should be initiated and he may initiate this explicitly, for instance, by calling a special service number or by selecting a special service of the SIM-card in the communication terminal via the keyboard of the communication terminal. In another variant, a callback method is automatically initiated when the called number corresponds to a number recorded in a special callback list, this list possibly being stored on the SIM-card or in the service center. In a variant it is also possible that it is sufficient if only the area code of the called number is recorded in this list. Finally, it is also possible that each call, or at least each long-distance call, initiates a callback method.

After the decision as to whether or not a callback method should be initiated, the callback method is preferably started by the communication terminal A by transmitting a special callback message 80 as a callback order 8 to a service center 9. The callback message 80 comprises an identification field 81, identifying the callback service, a field 82, containing the number of the calling participant, and a field 83, containing the number of the called participant.

The callback message is prepared and transmitted by a special callback request application, which is preferably located on a SIM-card. For one skilled in the art it is easy to program the corresponding application, for instance as a Java applet (which can obviously also run outside a SIM-card, for example in a personal computer). The callback request application can transmit the callback message 80, for instance by means of a short message or USSD data, via a communication network 7 to a service center 9. The communication network 7 is, for example, a mobile radio network, e.g. a GSM-network, and/or a fixed network, via which communication terminals A, such as mobile telephones and/or personal computers, communicate with each other.

The callback order 8 is received by a service center 9; it is recognized as a callback message 80 and passed on to a callback application 90 for further processing of callback orders. For instance, this is implemented such that the service center 9 comprises a SIM-server, for example a short message service center (SSC), in which special messages are recognized and handed over to respective special applications for further processing, in this case to the callback application 90, according to the SICAP method described in EP 0689 368 B1 or according to a similar method.

The callback application 90 retrieves the number of the calling participant 82 and the number of the called participant 83 from the callback message 80. Based on tables of tariffs, for example stored in a database 91 accessible to the service center, the callback application 90 preferably determines the most cost-effective destination gateway 3c with access to a backbone 1, in order to establish a connection with the communication terminal B of the called participant. For that purpose, the tables of tariffs in the database 91 contain, for instance, information concerning the geographic location and the different tariffs for different time zones for the available gateways that have access to backbone 1.

In a variant, the callback application 90 also determines the most cost-effective local gateway 3a with access to backbone 1, in order to establish a connection 11 with the communication terminal A of the calling participant.

The tariffs stored in the tables of tariffs of the database 91 can be updated and maintained, for instance by the respective gateways 3a, 3b, 3c themselves, directly via a communication network, preferably by making use of security services, for example TTP-services (trusted third party) or PTP-services (point-to-point). This can take place by means of direct access to the database 91, or to a database server, or by means of special services via the service center 9.

When the two gateways 3a and 3c are determined, the callback application 90 preferably compares the tariff costs for a direct connection, between the two communication terminals A and B, to the total tariff costs of the connection from the local gateway 3a to the communication terminal A and from the destination gateway 3c to the communication terminal B. If the tariff costs are more favorable for the direct connection, the callback application 90 initiates a direct connection between the two communication terminals A, B, which connection can be established in the conventional way known to one skilled in the art. If the total tariff costs for the connection of the local gateway 3a to the communication terminal A and for the connection of the destination gateway 3c to the communication terminal B are more favorable, these connections are established according to the invention such that the calling participant can communicate with the called participant by means of the communication terminal A via the connection to the local gateway 3a, from there via backbone 1 to the destination gateway 3c, and from there via the connection to the communication terminal B. The connections are established, for instance, by the callback application 90 sending instructions for establishing a connection with the communication terminal A and with the communication terminal B to the local gateway 3a and to the destination gateway 3c, respectively. The instructions for establishing a connection contain information for the identification of the calling participant's communication terminal A, of the local gateway 3a, of the called participant's communication terminal B, and of the destination gateway 3c. The communication between the service center 9 and the gateways 3a, 3b, 3c takes place via a communication network, for instance an ATM network, an Intranet or the public Internet.

In a variant, the indirect connection via the gateways 3a, 3c, which are interconnected via backbone 1, must be cheaper by a specified minimal amount before it is preferred to the direct connection between the communication terminals A, B. This minimal amount can be set, for instance, such that it corresponds to the tariff costs of the communication via the backbone 1, and may possibly include other extra costs. The backbone 1 is, for instance, an ATM network, an Intranet or the public Internet.

The destination gateway 3c receives the instruction to establish a connection from the service center 9 and establishes a connection 2c to the backbone 1. In a variant, the gateway 3c is permanently connected to the backbone 1. In addition, via the communication network 6, the gateway 3c initiates the synchronized establishment of a connection 10 to the communication terminal B, as will be described in more detail below. Furthermore, the gateway 3c maintains, for instance in a table, information for mapping connections, such that messages from the communication terminal A of the calling participant, received via the connection 2c to the backbone 1, are mapped onto the connection 10 to the communication terminal B of the called participant, and such that messages for the communication terminal A of the calling participant are mapped onto the gateway 3a via the connection 2c to the backbone 1. The communication network 6 is, for example, a mobile radio network, e.g. a GSM-network, or a fixed network.

The local gateway 3a receives the instruction to establish a connection from the service center 9, and establishes a connection 2a to the backbone 1. In a variant, the gateway 3a is permanently connected to the backbone 1. In addition, via the communication network 4, the gateway 3a initiates the synchronized establishment of a connection 11 to the communication terminal A, as will be described in more detail below. Furthermore, the gateway 3a maintains, for instance in a table, information for mapping connections, such that messages from the communication terminal B of the called participant, received via the connection 2a to the backbone 1, are mapped onto the connection 11 to the communication terminal A of the calling participant, and such that messages for the communication terminal B of the called participant are mapped onto the gateway 3c via the connection 2a to the backbone 1. The communication network 4 is, for example, a mobile radio network, e.g. a GSM-network, or a fixed network.

Synchronization of the establishment of a connection between the local gateway 3a and the communication terminal A with the establishment of a connection between the destination gateway 3c and the communication terminal B takes place, for example, via the backbone 1. For instance, the destination gateway 3c can communicate to the local gateway 3a via the connection 2c, the backbone 1, and the connection 2a that it has initiated the establishment of a connection to the communication terminal B of the called participant. In response, the local gateway 3a sends the actual callback 11 to the communication terminal A of the calling participant. Thereupon, the communication terminal A can immediately establish the connection to the local gateway 3a and thus await in a transparent fashion, via the connection 11, the connection 2a, the backbone 1, and the connection 2c, the establishment of a connection 10 of the destination gateway 3c to the communication terminal B of the called participant.

In another variant, control of the synchronization occurs, for example, through the local gateway 3a sending the actual callback 11 to the communication terminal A of the calling participant. Thereupon, the communication terminal A can immediately establish the connection to the local gateway 3a. In response, the local gateway 3a can communicate to the destination gateway 3c via the connection 2a, the backbone 1, and the connection 2c that it has initiated the establishment of a connection to the communication terminal A of the calling participant. Thereupon, the destination gateway 3c can initiate the establishment of a connection 10 to the communication terminal B. For a person skilled in the art there are additional embodiments for this establishment of a connection, which will not be discussed any further.

When the connections between the local gateway 3a and the communication terminal A and between the destination gateway 3c and the communication terminal B are established, communication between the participants may begin. For instance, speech information captured by the communication terminal A are transmitted as data to the local gateway 3a via the communication network 4. Besides mapping the respective connections according to the above-mentioned table, the gateways 3a, 3b, 3c are also taking on the function to execute protocol conversions between the connected communication networks, if necessary. This is achieved, for instance, by retrieving participant data from the protocol data units received from a first communication network, for example communication network 4, and embedding them into the corresponding protocol data units of a second communication network, for instance backbone 1, before they are sent via the second communication network, for instance, by means of connection 2a via the backbone 1 to the destination gateway 3c. Mapping of connections and conversion of protocols work in both directions, such that the participants can communicate transparently.

The callback application 90 of the service center 9 preferably monitors, for instance, the current tariffs of the gateways 3a, 3b, 3c for the duration of a connection, initiated on its initiative, between two communication terminals A and B via a backbone 1, for instance by means of the tables of tariffs in the database 91. In addition, the callback application 90 maintains for that purpose a table, for instance, where information is stored for the identification of the calling participant's communication terminal A, of the local gateway 3a, of the called participant's communication terminal B, and of the destination gateway 3c. For a connection to one of the communication terminals A or B, which it is monitoring, the callback application 90 can initiate a change of connection, in the case where it finds a gateway 3b with a current tariff for a current time zone cheaper by at least a pre-defined amount. For instance, this can be implemented such that the callback application 90 sends to the cheaper gateway 3b an instruction to initiate a handover from the more expensive local gateway 3a to the cheaper gateway 3b. The instructions contain, for example, information for the identification of the more expensive gateway to be replaced, of the communication terminal A connected to this gateway, of the gateway 3c involved, and of the communication terminal B connected to this latter gateway.

The more cost-effective gateway 3b receives the instruction to initiate a handover from the service center 9 and establishes a connection to the backbone 1. In a variant, the gateway 3b is permanently connected to the backbone 1. In addition, the gateway 3b forwards the change of connection, for instance through a handover message 12, via the communication network 5 to the communication terminal A, connected to the gateway 3a to be replaced. For instance, the change of connection (handover) can be executed by the communication terminal A to be replaced. This can be done by the communication terminal A, in response to the handover message, releasing the connection to the gateway 3a to be replaced and establishing in its place the connection to the cheaper gateway 3b. The more cost-effective gateway 3b maintains, for instance in a table, information for mapping connections, such that messages from the communication terminal B of the called participant, received via the connection 2b to the backbone 1, are mapped onto the connection 12 to the communication terminal A of the calling participant, and such that messages for the communication terminal B of the called participant are mapped onto the gateway 3c via the connection 2b to the backbone 1. The gateway 3a, replaced as a result of the handover, clears the respective entry in the table for mapping connections, and releases the connection to the backbone 1. In a variant, the connection to the backbone 1 remains. The destination gateway 3c is informed about the change of connection (handover) from gateway 3a to the more cost-effective gateway 3b, for instance by the replaced gateway 3a or by the new gateway 3b. Thus the destination gateway 3c can update, for instance the respective table, with the new information for mapping connections for messages to the communication terminal A of the calling participant via the connection 2b to the backbone 1 onto the more cost-effective gateway 3b. The transparent communication between the participants via the communication terminals A and B, the gateways 3b and 3c, and the backbone 1 takes place as described above through mapping of connections and conversion of protocols in both directions. The communication network 5 is, for example, a mobile radio network, e.g. a GSM-network, or a fixed network. In an additional variant, the synchronization of the handover and the related distribution of information to the involved gateways can be executed by the callback application 90 of the service center 9 or alone by the new cost-effective gateway 3b via the backbone 1. For a person skilled in the art there are additional embodiments for the change of connection (handover), which will not be discussed any further.

Besides the connection release between a communication terminal A and a gateway 3a, as a result of a connection change (handover), as was described above, there is naturally also a connection release caused by at least one participant by means of his communication terminal A, B. This connection release caused by a participant is handled, for instance, by the gateway 3a, 3b, 3c connected to the affected communication terminal A, B. The gateway 3a, 3b, 3c detects such a connection release caused by a communication terminal A, B by methods known to one skilled in the art, and forwards a connection release instruction, according to the table with information for mapping of connections, to the gateway 3a, 3b, 3c involved in the connection, clears the entry corresponding to the connection in this table, and terminates the connection 2a, 2b, 2c to the backbone 1. In a variant, the connection 2a, 2b, 2c to the backbone 1 remains. The involved gateway 3a, 3b, 3c receiving the connection release instruction forwards it according to the table with information for mapping of connections by releasing the relevant connection with the corresponding communication terminal A, B. Thereafter, the involved gateway 3a, 3b, 3c clears the entry corresponding to the connection in this table and terminates the connection 2a, 2b, 2c to the backbone 1. In a variant, the connection 2a, 2b, 2c to the backbone 1 remains.

The callback application 90 in the service center 9 is informed about the connection release so that the corresponding entry can be cleared in the table for monitoring connections. For instance, this information can be transmitted to the callback application 90 by an involved gateway 3a, 3b, 3c during the connection release.

After termination of a connection, the gateways 3a, 3b, 3c previously involved in the connection can, for instance, calculate the costs of communication for their sections of the connection between the communication terminal A of the calling participant and the communication terminal B of the called participant based on the measured duration of communication and the corresponding tariffs of the respective gateway 3a, 3b, 3c for the relevant time zones, and charge the calculated costs, for instance, to the calling participant, who can be identified by a participant identification (for example the international mobile subscriber identity, IMSI). The calculated costs are placed in a billing record, and are transmitted, preferably by making use of security services, for example TTP-services (trusted third party) or PTP-services (point-to-point), to a billing center, preferably the participant's home billing center. In the billing center, the costs received from the gateways for their respective sections of the connection are integrated, for instance, into a standard account which is sent to the participant. In a variant, the gateways 3a, 3b, 3c dispose of means to charge the calculated costs directly to the calling participant, for instance by debiting an amount of money stored on his SIM-card. In order to ensure correctness of the costs transmitted by the gateways 3a, 3b, 3c, the billing center preferably has means to check the tables of tariffs and the transmitted time values, respectively the clock responsible for the time measurement, in the respective gateways 3a, 3b, 3c. For instance, the gateway 3a can charge the communication costs for the connection 11, between the gateway 3a and the communication terminal A, to the calling participant with the communication terminal A. In a variant, gateway 3a can in addition also charge to the participant the communication costs for the connection 2a to the backbone 1. In another variant, gateway 3a can further request from the participant a contribution for the use of the backbone 1. Direct charging by the gateways has the advantage that the gateways can be financially independent and that they can be managed, for instance, by different operators, which may be independent from network operators, for example. In such cases, a part of the amount charged by the billing center may be reimbursed to the operators of the gateways.

It is important to point out that in a variant the monitoring of current tariffs of the gateways, for the duration of a connection, and the corresponding initiation of a change of connection (handover) can be executed directly from a communication terminal involved in the connection. This is achieved, for example, by way of storing in a SIM-card of the communication terminal a table of tariffs with information about at least certain gateways and by the SIM-card determining a more cost-effective gateway in a fashion similar to the method described above and by directly executing a change of connection (handover) from a gateway 3a to a more cost-effective gateway 3b. In a variant, the SIM-card additionally executes as well determination of the local gateway 3a and of the destination gateway 3c, establishes the connection to the local gateway 3a, and initiates the establishment of a connection between the destination gateway 3c and the communication terminal B. For this variant, the table of tariffs in the SIM-card can be optimized, for example, according to the requirements of its participant and/or owner or a group of participants/owners. In another variant, the SIM-card can access the table of tariffs, for instance stored in the service center 9, by means of special services.

Personal SIM-cards, capable of initiating a callback method and/or capable of executing the callback method, including determination of gateways, the establishment of connections and/or monitoring of connections with change of connections (handover), may be offered to participants or groups of participants by a service provider, who, for instance, may also be the operator of the gateways 3a, 3b, 3c and the backbone 1. Such cards may be offered as a subscription with periodic billing and payment, or they may be time-limited and can be extended for payment. For example, the SIM-cards may also contain defined amounts (pre-payment), which are debited directly with the tariff costs. Due to the fact that such cards may directly access privileged services, encryption and security methods, such as trusted third party (TTP) or point-to-point encryption, for instance, are employed in order to prevent unauthorized use.

What is claimed is:

1. A method for communicating between a first communication terminal and at least a second communication terminal, said method comprising:

transmitting a special message representing a callback order from the first communication terminal to a service center the service center being adapted to access a database constructed and arranged to store economic data for each of a plurality of destination gateways therein;

processing said callback order by a callback application in the service center, wherein said processing includes determining a selected destination gateway from the plurality of destination gateways, and transmitting instructions for establishing a connection via a communication network (1) to a local gateway having access to a backbone to establish a connection with the first communication terminal and (2) to the selected destination gateway to establish a connection with one of the second communication terminals;

establishing a connection from the local gateway to the first communication terminal, the connection having certain economic data associated therewith;

establishing a connection from the selected destination gateway to one of the second communication terminals, the connection having certain economic data associated therewith; and communicating data between the first communication terminal and one of the second communication terminals, wherein the communicated data are received through the local and the selected gateways from the respective communication terminal connected at any one time, the communicated data are transmitted between the local and the selected destination gateways via the backbone, and the communicated data are received through the local and the selected destination gateways via the backbone and are transmitted to the respective connected communication terminal.

2. The method according to claim 1, further comprising:

comparing the economic data of the connection from the local gateway to the first communication terminal and the economic data of the connection from the destination gateway to one of the second communication terminals, with the economic data of a direct connection from the first communication terminal to the second communication terminal;

determining whether the economic data of the direct connection meets certain criteria; and establishing the direct connection from the first communication terminal to one of the second communication terminals when the economic data thereof meets the certain criteria.

3. The method according to claim 2, wherein the economic data includes communication tariff costs and the certain criteria includes cost-effectiveness, whereby the direct connection between the first communication terminal and one of the second communication terminals is established when the cost of the direct connection becomes cheaper than the tariff costs from the local gateway to the first communication terminal and the tariff costs from the selected destination gateway to one of the second communication terminals by a predetermined amount.

4. The method according to claim 1, wherein the economic data includes communication tariff costs and the local gateway is determined such that the current communication tariff costs from the local gateway to the first communication terminal are minimal.

5. The method according to claim 1, wherein the special message identifies callback as a special service and includes the number of the first or calling participant and the number of the second or called participant.

6. The method according to claim 1, wherein the special message is transmitted in a SMS short message or by means of USSD data.

7. The method according to claim 1, wherein the economic data of each gateway is a current tariff and the current tariffs of the plurality of gateways are monitored for the duration of the connection, whereby if the current tariff of a monitored gateway is lower or smaller than the current tariff of the selected gateway by at least a predefined amount, one of the communication terminals being connected by a change of connection to the backbone via the monitored gateway.

8. The method according to claim 6, wherein the monitored gateway is more cost-efficient than the selected gateway at one section of the connection.

9. The method according to claim 7, wherein the monitoring of the current tariffs is executed by the service center.

10. The method according to claim 7, wherein the change of connection is initiated by the monitored gateway through a handover.

11. The method according to claim 1, wherein the first communication terminal or one of the second communication terminals include mobile radio telephones comprising a SIM-card.

12. The method according to claim 2, wherein the database is a central database and at least certain of the plurality of gateways being constructed and arranged to store economic data in the central database.

13. The method according to claim 12, wherein the economic data includes communication tariff costs.

14. The method according to claim 1, further comprising:

calculating communication costs for at least certain sections of a connection between the first communication terminal and one of the second communication terminals; and transmitting the calculated communication costs to a billing center for charging to a first participant, the first participant being accessible to the first communication terminal.

15. A system for executing a callback method for telecommunications, the system comprising:

a plurality of communication terminals, the plurality of communication terminals including a communication terminal of a called participant and a communication terminal of a calling participant;

a plurality of gateways being connectable to at least certain of the communication terminals via first communication networks; and at least one service center being configured and positioned to communicate with the plurality of gateways via second communication networks and with the at least certain communication terminals via the first communication networks, wherein at least certain of the communication terminals being constructed and arranged to initiate the callback method through transmission of a special message representing a callback order to the service center, wherein the service center is accessible to a database constructed and arranged to store data tables therein and including a server and a callback application, the callback application is constructed and arranged to process said callback order and to determine, on the basis of the data tables, a selected destination gateway for the connection of the selected destination gateway to the communication terminal of the called participant, and to transmit connection establishment instructions via one of the second communication networks to a local gateway to establish a connection to the communication terminal of the calling participant, and to the selected destination gateway to establish a connection to the communication terminal of the called participant, and wherein each of the plurality of gateways is accessible to a backbone and configured and positioned to detect and receive the instructions for connection establishment, establish connections with the respective communication terminals in accordance with the instructions for connection establishment, and facilitate communication between the calling and the called participants such that the plurality of gateways receives data from the communication terminal connected at any one time, and transmits the data to the selected gateway via the backbone, and the plurality of gateways receive data via the backbone and transmit the data to the respective connected communication terminal.

16. The system according to claim 15, wherein the callback application is constructed and arranged to determine a local selected gateway for the connection of the local gateway to the communication terminal of the calling participant.

17. The system according to claim 16, wherein the local selected gateway is the momentarily most cost-efficient local gateway to the communication terminal of the calling participant.

18. The system according to claim 15, wherein at least certain communication terminals are mobile radio telephones, fixed telephones or personal computers including a SIM card being constructed and arranged to include, prepare and transmit the special callback messages.

19. The system according to claim 18, wherein the special message identifies callback as a special service and includes the number of the first or calling participant and the number of the second or called participant.

20. The system according to claim 18, wherein the SIM card prepares the callback messages and transmits the callback messages to a service center as short messages or by means of USSD data.

21. The system according to claim 18, wherein the SIM card includes a predetermined amount of credit wherein the predetermined amount of credit is debited with the tariff costs incurred while the at least certain communication terminals is connected.

22. The system according to churn 15, wherein the data tables include tariff tables having current tariffs of the plurality of gateways stored therein.

23. The system according to claim 22, wherein the callback application is constructed and arranged to monitor the current tariffs of the plurality of gateways for the duration of the communication between the respective communication terminals, transit instructions with required data to the respective gateways for initiating a handover if the current tariff of a monitored gateway is lower or smaller by a predefined amount than the current tariff of the selected gateway.

24. The system according to claim 15, wherein the service center comprises a short message service center.

25. The system according to claim 15, wherein the plurality of gateways is constructed and arranged to detect a termination of communication on the part of a first communication terminal, release the connection with this first communication terminal, transmit a connection release instruction via the backbone to the selected gateway with one of the second communication terminals connected thereto, receive connection release instructions via the backbone, and release the connection with the corresponding connected second communication terminal.

26. The system according to claim 15, wherein the plurality of gateways is constructed and arranged to detect handover instructions, initiate a change of connection in a communication terminal to a monitored gateway by means of a handover message, and inform the plurality of gateways about this change of connection via the backbone.

27. The system according to claim 15, wherein the plurality of gateways is constructed and arranged to calculate communication costs for at least certain sections of a connection including the respective gateway between the first communication terminal and the second communication terminal, and transmit the calculated communication costs to a billing center for charging the calling participant.

28. The system according to claim 15, wherein the backbone is a ATM network, an Intranet and/or the Internet.

29. The system according to claim 15, wherein the first communication networks comprise a mobile radio network and/or a fixed network.

30. The system according to claim 15, wherein the second networks comprise an ATM network, an Internet and/or the Internet.

* * * * *